June 2, 1953 M. GRAVES 2,640,379
DRILL
Filed Nov. 28, 1951

INVENTOR.
MARK GRAVES
BY
Oberlin & Limbach
ATTORNEYS.

Patented June 2, 1953

2,640,379

UNITED STATES PATENT OFFICE 2,640,379

DRILL

Mark Graves, Cleveland Heights, Ohio

Application November 28, 1951, Serial No. 258,614

1 Claim. (Cl. 77—67)

This invention relates as indicated to a novel drill, and more particularly to a drill intended for use in penetrating or forming holes in extremely hard metal articles.

When performing a drilling or boring operation upon very hard metals such as tempered steels having a hardness in excess of 45 Rockwell C, for example, the usual drills provided with sharp cutting edges to cut their way through the work are very rapidly dulled and become useless. Even when lubricants are provided, there is a tendency for such drills to overheat and even break. It has accordingly been proposed to utilize another type of drill having edges which are not cutting edges but which serve locally to concentrate very heavy working pressures imposed on the drill to soften the metal of the work-piece through heat of friction as the drill turns. The metal of the drill must, of course, be of a type which does not soften when highly heated through such frictional engagement. "Stellite" is a good example of a steel suitable for employment in my new drill.

With drills previously employed, operating on such metal softening rather than metal cutting principle, there has, however, continued to exist a considerable problem due to drill breakage. This has, of course, been principally due to the heavy working pressures employed, the tendency of the softened and removed metal to clog and jam the drill and the fact that the working edges at the end of the drill are ordinarily insufficiently supported. In an attempt to provide sufficient clearance for the removed metal, the shanks or bodies of the drills have frequently been cut away to an extent seriously weakening the same and making it difficult to drill a true hole.

It is accordingly a principal object of my invention to provide a novel drill particularly adapted for the penetration of very hard metals.

Another object is to provide such drill having a generally pyramidal working end with the working edges or ridges thereon being adequately supported.

A further object is to provide such drill having a generally round body to ensure the production of a true and round hole.

Still another object is to provide such drill having longitudinally extending flutes formed in a manner effective to ensure escape of the removed metal without undue weakening of the tool.

Other objects of the invention will appear as the description proceeds.

To the accomplishment of the foregoing and related ends, said invention then comprises the features hereinafter fully described and particularly pointed out in the claim, the following description and the annexed drawing setting forth in detail certain illustrative embodiments of the invention, these being indicative, however, of but a few of the various ways in which the principle of the invention may be employed.

In said annexed drawing—

Figure 1:
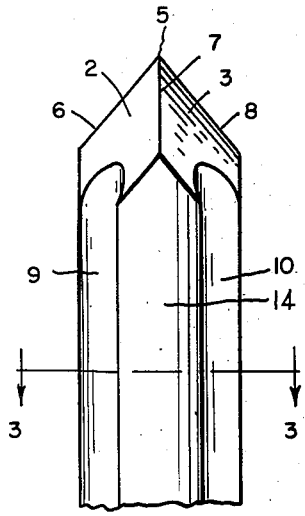
Fig. 1 is a fragmentary side view of a drill embodying the principles of my invention.

Referring now more particularly to such drawing, the embodiment of my new drill there illustrated comprises a shank portion 1 having a body portion of generally circular cross-section extending therefrom and terminating in a generally pyramidal working end portion comprising flat faces 2, 3 and 4 meeting at a common central point 5 and separated by sloping edges or ridges 6, 7 and 8. Such edges or ridges may desirably be inclined at an angle of approximately 40° to the axis of the tool.

Longitudinally extending flutes 9, 10 and 11 are provided in such drill body respectively extending into such end faces 2, 3 and 4 symmetrically thereof. Each such flute should have a maximum depth of approximately one-fourth the diameter of the drill in order to be effective in affording a means of escape for the metal removed from the work-piece and at the same time not so deep as to leave the edges or ridges 6, 7 and 8 insufficiently supported. Each such groove or flute should be of a width (on an arc circumferentially of the drill body) equal to the circumferential width of the individual lands 12, 13 and 14 separating such flutes. Accordingly, approximately 50% of the circumference of the drill will be comprised by such lands, adding greatly to the strength of the drill and ensuring the formation of a true and round hole thereby. It will also be noted that since such flutes are preferably of arcuate contour the outer ends of the ridges 6, 7 and 8 are left particularly well supported and are consequently enabled to withstand the severe stresses to which such portions are subjected in use.

Figure 2:
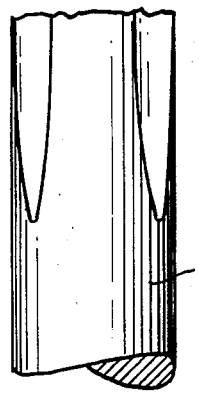
Fig. 2 is an end view showing the cutting end of the drill of Fig. 1 on a somewhat enlarged scale.
Figure 2:
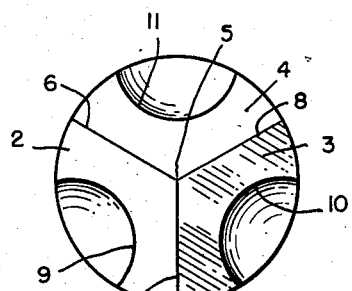
Figure 3:
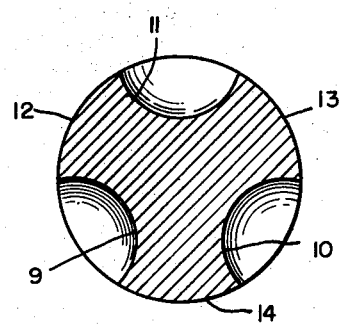
Fig. 3 is a transverse section taken on the line 3—3 on Fig. 1.
Figure 4:
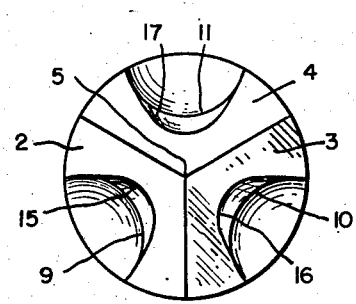
Fig. 4 is an end view similar to Fig. 2 but illustrating a slightly modified drill end construction.

In Fig. 4 embodiment, the drill there illustrated is substantially identical to that shown in Figs. 1-3 inclusive, the same flutes 9, 10 and 11 extending into the end faces 2, 3 and 4, but additional relief is provided in such end faces in the form of scallops 15, 16 and 17 leading from the ends of the flutes further into such end faces toward point 5. This additional relief facilitates the escape of metal removed from the work-piece without, however, appreciably weakening the tool since such scallops extend only in the general direction of point 5 which is left still well supported and without any weakening of the outer ends of the ridges terminating in the wide lands which separate the flutes.

I have found that a drill formed in accordance with the above description is capable of extremely rapid action in penetrating very hard metals such as steel die blocks, jigs, tools and the like, and without any appreciable danger of breakage of the same. I am enabled to operate such drill under very high working pressures, and at very high speeds, these both being factors of major importance in the removal of metal by this process, whereas with prior art drills with which I am familiar considerably lower pressures and lower operating speeds have been required and, even so, breakage of the drill in use has been quite common.

I prefer to employ straight flutes as shown. The number of end faces and intervening ridges at the working end of the tool may be varied but should always be at least three, as shown, to ensure holding of concentricity in use. An advantage of flutes of arcuate section, as shown, is that metal removed by the drill will move along such flutes without tending to wedge or jam between the drill and the wall of the hole being drilled. Such flutes are also of assistance when employing a coolant, such as an appropriate cutting oil. Flutes of V-shaped cross-section may be employed, but arcuately transverse flutes are much preferred.

The metal of my new drill should have a very high annealing temperature well in excess of that of the work. An example of commercially available steel suitable for my purposes is Haynes-Stellite "J" metal which has the following formula:

Cobalt _____ 40% minimum.
Chromium _____ 30-34%.
Tungsten _____ 17-19%.
Other usual alloying materials_ 11% maximum.

Other modes of applying the principle of the invention may be employed, change being made as regards the details described, provided the features stated in the following claim or the equivalent of such be employed.

I therefore particularly point out and distinctly claim as my invention:

A hard, heat-resisting, drill comprising a straight elongated body portion of generally circular cross-section, a three-faced pyramidal end portion with the apex of such pyramid lying on the axial center line of said drill and forming the work-engaging point thereof, each such face being of equal area and separated from adjacent faces by radial ridges formed by the intersections of the planes of such faces, and three straight, longitudinally extending, transversely arcuate flutes throughout the length of said body portion respectively terminating symmetrically in said three end faces, the depth of each flute being approximately one-fourth the diameter of said drill and the width of each flute on a line circumferentially of said drill being substantially equal to the width of each intervening land.

MARK GRAVES.

References Cited in the file of this patent

UNITED STATES PATENTS

| Number | Name | Date |
|--------|------|------|
| 180,554 | Cubberley | Aug. 1, 1876 |
| 2,260,288 | Black | Oct. 28, 1941 |